United States Patent
Zhang

(10) Patent No.: US 10,333,600 B2
(45) Date of Patent: Jun. 25, 2019

(54) ANTENNA PORT MAPPING METHOD AND APPARATUS

(71) Applicant: Huawei Technologies Co., Ltd., Shenzhen (CN)

(72) Inventor: Pengcheng Zhang, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 305 days.

(21) Appl. No.: 15/374,360

(22) Filed: Dec. 9, 2016

(65) Prior Publication Data

US 2017/0093476 A1 Mar. 30, 2017

Related U.S. Application Data

(63) Continuation of application No. PCT/CN2014/079486, filed on Jun. 9, 2014.

(51) Int. Cl.
*H04B 7/06* (2006.01)
*H01Q 21/24* (2006.01)
*H04B 7/0456* (2017.01)

(52) U.S. Cl.
CPC ........... *H04B 7/0617* (2013.01); *H01Q 21/24* (2013.01); *H04B 7/0456* (2013.01)

(58) Field of Classification Search
CPC ..... H01Q 21/24; H04B 7/0456; H04B 7/0617
USPC ....................................................... 342/360
See application file for complete search history.

(56) References Cited

U.S. PATENT DOCUMENTS

| | | | |
|---|---|---|---|
| 6,107,963 A | 8/2000 | Ohmi et al. | |
| 2007/0049347 A1* | 3/2007 | Jin | H01Q 3/2605 455/562.1 |
| 2011/0205930 A1 | 8/2011 | Rahman et al. | |
| 2012/0088537 A1 | 4/2012 | Petersson et al. | |
| 2012/0319920 A1 | 12/2012 | Athley et al. | |

(Continued)

FOREIGN PATENT DOCUMENTS

| | | |
|---|---|---|
| CN | 102171946 A | 8/2011 |
| CN | 102752035 A | 10/2012 |

(Continued)

OTHER PUBLICATIONS

Foreign Communication From a Counterpart Application, PCT Application No. 14896803.5, Extended European Search Report dated Apr. 3, 2017, 10 pages.
Foreign Communication From a Counterpart Application, Chinese Application No. 2014800017513, Chinese Search Report dated Jan. 21, 2017, 2 pages.

(Continued)

*Primary Examiner* — Timothy X Pham
(74) *Attorney, Agent, or Firm* — Conley Rose, P.C.

(57) ABSTRACT

An antenna port mapping method and apparatus, where the method includes performing first weighted processing and second weighted processing separately on first multichannel signal to be sent in a first polarization direction, and forming two beams in the first polarization direction after an antenna array radiates the processed first multichannel signal; and performing third weighted processing and fourth weighted processing separately on second multichannel signal to be sent in a second polarization direction, and forming two beams in the second polarization direction after the antenna array radiates the processed second multichannel signal. The method implements mapping of the antenna array to four antenna ports, thereby extending an application scenario of antenna port mapping.

6 Claims, 3 Drawing Sheets

```
┌─────────────────────────────────────────────┐
│ Perform first weighted processing and second weighted
│ processing separately on first multichannel signal to be sent in a
│ first polarization direction, and form a first beam and a second    │──101
│ beam in the first polarization direction after an antenna array
│ radiates the processed first multichannel signal, so as to
│ implement mapping of the antenna array to two ports in the first
│ polarization direction, where a weighted value for the second
│ weighted processing is a reverse conjugation of a weighted value
│ for the first weighted processing
└─────────────────────────────────────────────┘
                         │
                         ▼
┌─────────────────────────────────────────────┐
│ Perform third weighted processing and fourth weighted
│ processing separately on second multichannel signal to be sent in
│ a second polarization direction, and form a third beam and a       │──102
│ fourth beam in the second polarization direction after the antenna
│ array radiates the processed second multichannel signal, so as to
│ implement mapping of the antenna array to the other two ports in
│ the second polarization direction, where a weighted value for the
│ fourth weighted processing is a reverse conjugation of a weighted
│ value for the third weighted processing
└─────────────────────────────────────────────┘
```

(56) References Cited

U.S. PATENT DOCUMENTS

| | | | | |
|---|---|---|---|---|
| 2013/0076566 A1* | 3/2013 | Jiang | ............ | H01Q 1/246 342/373 |
| 2015/0333885 A1* | 11/2015 | Athley | ............ | H04L 5/0048 375/219 |
| 2017/0099093 A1* | 4/2017 | Zhang | ............ | H04B 7/0456 |

FOREIGN PATENT DOCUMENTS

| | | |
|---|---|---|
| CN | 103547341 A | 1/2014 |
| CN | 103650366 A | 3/2014 |
| EP | 2925042 A1 | 9/2015 |
| EP | 2999133 A1 | 3/2016 |
| JP | 2000216619 A | 8/2000 |
| WO | 2012146404 A1 | 11/2012 |
| WO | 2014079329 A1 | 5/2014 |

OTHER PUBLICATIONS

Foreign Communication From a Counterpart Application, Chinese Application No. 201480001751.3, Chinese Office Action dated Feb. 4, 2017, 6 pages.

Foreign Communication From a Counterpart Application, PCT Application No. PCT/CN2014/079486, English Translation of International Search Report dated Mar. 2, 2015, 2 pages.

Foreign Communication From a Counterpart Application, PCT Application No. PCT/CN2014/079486, English Translation of Written Opinion dated Mar. 2, 2015, 12 pages.

Foreign Communication From a Counterpart Application, Japanese Application No. 2016-572248, Japanese Office Action dated Apr. 17, 2018, 3 pages.

Foreign Communication From a Counterpart Application, Japanese Application No. 2016-572248, English Translation of Japanese Office Action dated Apr. 17, 2018, 3 pages.

\* cited by examiner

ANTENNA PORT MAPPING METHOD AND APPARATUS

CROSS-REFERENCE TO RELATED APPLICATION

This application is a continuation of International Application No. PCT/CN2014/079486, filed on Jun. 9, 2014, the disclosure of which is hereby incorporated by reference in its entirety.

TECHNICAL FIELD

The present disclosure relates to the field of wireless communications technologies, and in particular, to an antenna port mapping method and apparatus.

BACKGROUND

In the field of wireless communications technologies, spectrum resources are limited, and how to improve the utilization rate of spectrum resources is particularly important. In a multiple-antenna technology, a transmit signal and a receive signal in a space domain are processed to improve the utilization rate of spectrum resources. In the multiple-antenna technology, multiple antennas at a transmit end may concurrently send multiple signals in a same frequency, so as to make full use of a space resource to improve a system capacity in a case in which the spectrum resources are not increased.

In the multiple-antenna technology, a freedom degree of a transmit-end channel visible on an air interface depends on a quantity of logical channels of frequency division, the quantity of logical channels may be considered as a quantity of antenna ports, a quantity of physical antennas is greater than or equal to the quantity of antenna ports, and mapping of a physical antenna to an antenna port (also called antenna port mapping) is one of the key technologies to implement the multiple-antenna technology.

At present, in an antenna port mapping process, in order to ensure isolation and coherency, a co-polarized antenna array is generally mapped to only one same antenna port. An array antenna formed by cross-polarized elements is used as an example. Because an antenna has two polarization directions, mapping to only two antenna ports is supported at present. As a receiving capability increases at a receive end, a requirement for mapping to more than two antenna ports is ever-increasing. Therefore, how to implement mapping of a physical antenna to more than two antenna ports is particularly important.

SUMMARY

Embodiments of the present disclosure provide an antenna port mapping method and apparatus, so as to solve a problem of mapping a physical antenna to more than two antenna ports. The technical solutions are as follows.

According to a first aspect, an antenna port mapping method is provided and used to implement mapping of an antenna array to four antenna ports, where the antenna array includes multiple columns of antenna elements and has a first polarization direction and a second polarization direction, and the method includes performing first weighted processing and second weighted processing separately on first multichannel signal to be sent in the first polarization direction, and forming a first beam and a second beam in the first polarization direction after the antenna array radiates the processed first multichannel signal, so as to implement mapping of the antenna array to two ports in the first polarization direction, where a weighted value for the second weighted processing is a reverse conjugation of a weighted value for the first weighted processing, and performing third weighted processing and fourth weighted processing separately on second multichannel signal to be sent in the second polarization direction, and forming a third beam and a fourth beam in the second polarization direction after the antenna array radiates the processed second multichannel signal, so as to implement mapping of the antenna array to the other two ports in the second polarization direction, where a weighted value for the fourth weighted processing is a reverse conjugation of a weighted value for the third weighted processing.

With reference to the first aspect, in a first possible implementation manner of the first aspect, the first weighted processing and the second weighted processing are implemented using a first weighted value matrix, and the first weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

where s is a quantity of columns of the antenna array; and the third weighted processing and the fourth weighted processing are implemented using a second weighted value matrix, and the second weighted value matrix is:

$$\begin{bmatrix} \beta_1, \beta_2, \ldots, \beta_s \\ \beta_s, \beta_{s-1}, \ldots, \beta_1 \end{bmatrix},$$

where s is the quantity of columns of the antenna array.

With reference to the first aspect or the first possible implementation manner of the first aspect, in a second possible implementation manner of the first aspect, the antenna array includes four columns of antenna elements.

According to a second aspect, an antenna port mapping apparatus is provided and configured to implement mapping of an antenna array to four antenna ports, where the antenna array includes multiple columns of antenna elements and has a first polarization direction and a second polarization direction, and the apparatus includes a first weighting unit configured to perform first weighted processing and second weighted processing separately on first multichannel signal to be sent in the first polarization direction, and form a first beam and a second beam in the first polarization direction after the antenna array radiates the processed first multichannel signal, so as to implement mapping of the antenna array to two ports in the first polarization direction, where a weighted value for the second weighted processing is a reverse conjugation of a weighted value for the first weighted processing; and a second weighting unit configured to perform third weighted processing and fourth weighted processing separately on second multichannel signal to be sent in the second polarization direction, and form a third beam and a fourth beam in the second polarization direction after the antenna array radiates the processed second multichannel signal, so as to implement mapping of the antenna array to the other two ports in the second polarization direction, where a weighted value for the fourth weighted processing is a reverse conjugation of a weighted value for the third weighted processing.

With reference to the second aspect, in a first possible implementation manner of the second aspect, the first weighting unit performs weighted processing using a first weighted value matrix, and the first weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

where s is a quantity of columns of the antenna array; and the second weighting unit performs weighted processing using a second weighted value matrix, and the second weighted value matrix is:

$$\begin{bmatrix} \beta_1, \beta_2, \ldots, \beta_s \\ \beta_s, \beta_{s-1}, \ldots, \beta_1 \end{bmatrix},$$

where s is the quantity of columns of the antenna array.

With reference to the second aspect or the first possible implementation manner of the second aspect, in a second possible implementation manner of the second aspect, the antenna array includes four columns of antenna elements.

According to a third aspect, an antenna port mapping apparatus is provided, including an antenna array, including multiple columns of antenna elements and having a first polarization direction and a second polarization direction; a signal source configured to provide first multichannel signal to be sent in the first polarization direction and second multichannel signal to be sent in the second polarization direction; a first weighted value circuit configured to perform first weighted processing and second weighted processing separately on the first multichannel signal, and form a first beam and a second beam in the first polarization direction after the antenna array radiates the processed first multichannel signal, so as to implement mapping of the antenna array to two ports in the first polarization direction, where a weighted value for the second weighted processing is a reverse conjugation of a weighted value for the first weighted processing; and a second weighted value circuit configured to perform third weighted processing and fourth weighted processing separately on the second multichannel signal, and form a third beam and a fourth beam in the second polarization direction after the antenna array radiates the processed second multichannel signal, so as to implement mapping of the antenna array to the other two ports in the second polarization direction, where a weighted value for the fourth weighted processing is a reverse conjugation of a weighted value for the third weighted processing.

With reference to the third aspect, in a first possible implementation manner of the third aspect, the first weighted value circuit performs weighted processing using a first weighted value matrix, and the first weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

where s is a quantity of columns of the antenna array; and the second weighted value circuit performs weighted processing using a second weighted value matrix, and the second weighted value matrix is:

$$\begin{bmatrix} \beta_1, \beta_2, \ldots, \beta_s \\ \beta_s, \beta_{s-1}, \ldots, \beta_1 \end{bmatrix},$$

where s is the quantity of columns of the antenna array.

With reference to the third aspect or the first possible implementation manner of the third aspect, in a second possible implementation manner of the third aspect, the antenna array includes four columns of antenna elements.

According to a fourth aspect, an antenna port mapping apparatus is provided, including an antenna array, including multiple columns of antenna elements and having a first polarization direction and a second polarization direction; a signal source configured to provide first multichannel signal to be sent in the first polarization direction and second multichannel signal to be sent in the second polarization direction; and a processor configured to perform first weighted processing and second weighted processing separately on the first multichannel signal, and form a first beam and a second beam in the first polarization direction after the antenna array radiates the processed first multichannel signal, so as to implement mapping of the antenna array to two ports in the first polarization direction, where a weighted value for the second weighted processing is a reverse conjugation of a weighted value for the first weighted processing, where the processor is further configured to perform third weighted processing and fourth weighted processing separately on the second multichannel signal, and form a third beam and a fourth beam in the second polarization direction after the antenna array radiates the processed second multichannel signal, so as to implement mapping of the antenna array to the other two ports in the second polarization direction, where a weighted value for the fourth weighted processing is a reverse conjugation of a weighted value for the third weighted processing.

The technical solutions provided by the embodiments of the present disclosure have the following beneficial effects.

Weighted processing is performed separately on multichannel signal to be sent in a first polarization direction and in a second polarization direction, and two beams in the first polarization direction and two beams in the second polarization direction are formed separately after an antenna array separately radiates the processed multichannel signal, which implements mapping of the antenna array to four antenna ports, thereby extending an application scenario of antenna port mapping.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may further still derive other drawings from these accompanying drawings without creative efforts.

DETAILED DESCRIPTION

To make the objectives, technical solutions, and advantages of the present disclosure clearer, the following further describes the embodiments of the present disclosure in detail with reference to the accompanying drawings.

In an antenna port mapping process, in order to ensure isolation and coherency, a co-polarized antenna array is generally mapped to only one same antenna port. Therefore, mapping to only two antenna ports is supported in the prior art. However, as a receiving capability increases at a receive end, a requirement for mapping to more than two antenna ports is ever-increasing. In view of this, in this application, two beams are formed in each polarization direction by performing weighted processing, so that an antenna array implements mapping to two antenna ports in a same polarization direction, thereby implementing mapping of the antenna array to four antenna ports.

Figure 1:
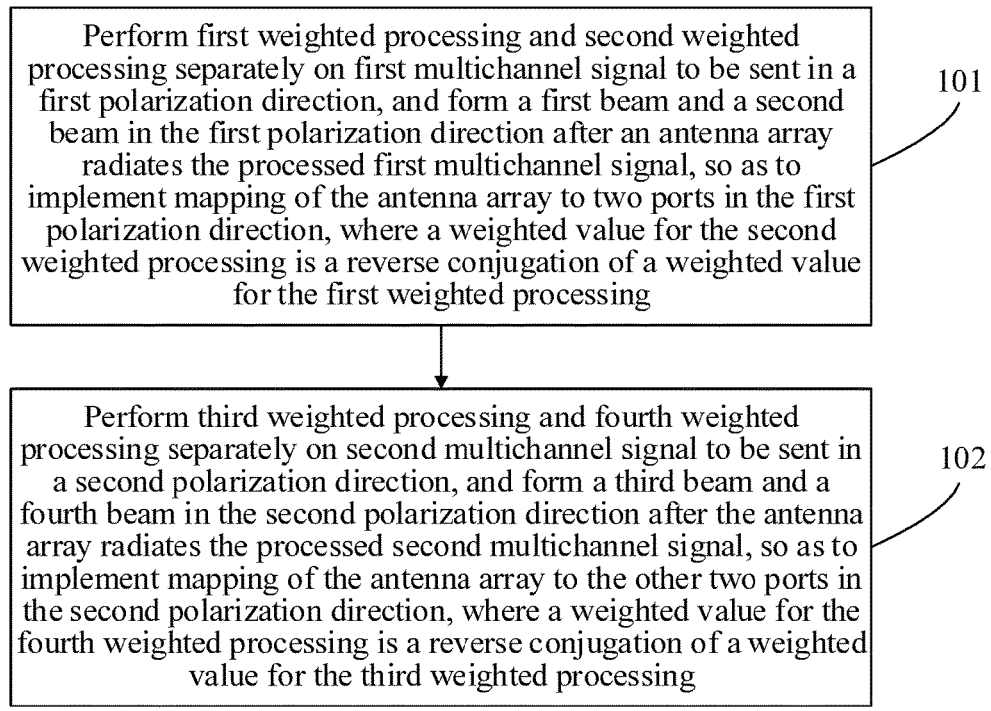
FIG. 1 is a flowchart of an antenna port mapping method according to an embodiment of the present disclosure.

With reference to the foregoing implementation environment, an embodiment of the present disclosure provides an antenna port mapping method. Referring to FIG. 1, a procedure provided by the method of this embodiment is as follows.

101: Perform first weighted processing and second weighted processing separately on first multichannel signal to be sent in a first polarization direction, and form a first beam and a second beam in the first polarization direction after an antenna array radiates the processed first multichannel signal, so as to implement mapping of the antenna array to two ports in the first polarization direction, where a weighted value for the second weighted processing is a reverse conjugation of a weighted value for the first weighted processing.

Optionally, the first weighted processing and the second weighted processing are implemented using a first weighted value matrix, and the first weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

where s is a quantity of columns of the antenna array.

102: Perform third weighted processing and fourth weighted processing separately on second multichannel signal to be sent in a second polarization direction, and form a third beam and a fourth beam in the second polarization direction after the antenna array radiates the processed second multichannel signal, so as to implement mapping of the antenna array to the other two ports in the second polarization direction, where a weighted value for the fourth weighted processing is a reverse conjugation of a weighted value for the third weighted processing.

Optionally, the third weighted processing and the fourth weighted processing are implemented using a second weighted value matrix, and the second weighted value matrix is:

$$\begin{bmatrix} \beta_1, \beta_2, \ldots, \beta_s \\ \beta_s, \beta_{s-1}, \ldots, \beta_1 \end{bmatrix},$$

where s is a quantity of columns of the antenna array.

The foregoing method is applicable to a wide beam scenario. The so-called wide beam scenario is a scenario in which an equivalent inter-column spacing of an antenna array is greater than an equivalent inter-column spacing of a conventional antenna array. The equivalent inter-column spacing of the conventional antenna array is below 0.6 wavelength ($\lambda$), for example, 0.5$\lambda$. However, as application scenarios increase, a demand for a wideband antenna increases gradually, and the equivalent inter-column spacing of the antenna array also becomes wider, for example, an antenna array with an equivalent inter-column spacing of 0.65~0.75$\lambda$.

In this application, it is discovered by analyzing channel coherence between beams that compared with an original element beam, a phase difference of a direction coefficient for multiple columns of wide beams obtained by performing weighted and coherent processing periodically changes. Generally, the change is unidirectionally continuous and the change is also a root cause for a coherence change. Generally, a quicker change causes lower coherence, a larger multi-flow probability, and a more uniform energy distribution between flows. When a weighted value mapped on the other port is implemented in a same polarization direction using a unidirectionally continuous change characteristic of a beam phase difference, a weighted value of an original beam may be directly conjugated reversely. In this way, beams on two ports are not the same in a phase of a direction coefficient, a phase difference changes rapidly with the change of an azimuth, coherence in a same channel is low, and a coherence equivalent spacing of the azimuth at N° (generally at about 30°, where a specification may be different) from a normal line may meet a requirement.

In the method provided by this embodiment of the present disclosure, weighted processing is performed separately on multichannel signal to be sent in a first polarization direction and in a second polarization direction, and two beams in the first polarization direction and two beams in the second polarization direction are formed separately after an antenna array separately radiates the processed multichannel signal, which implements mapping of the antenna array to four antenna ports, thereby extending an application scenario of antenna port mapping.

In order to describe an antenna port mapping method provided by the foregoing embodiment more clearly, with reference to content of the embodiment shown in FIG. 1, an antenna port mapping method is described in detail using the following embodiment. For details, refer to the following embodiment.

Figure 2:
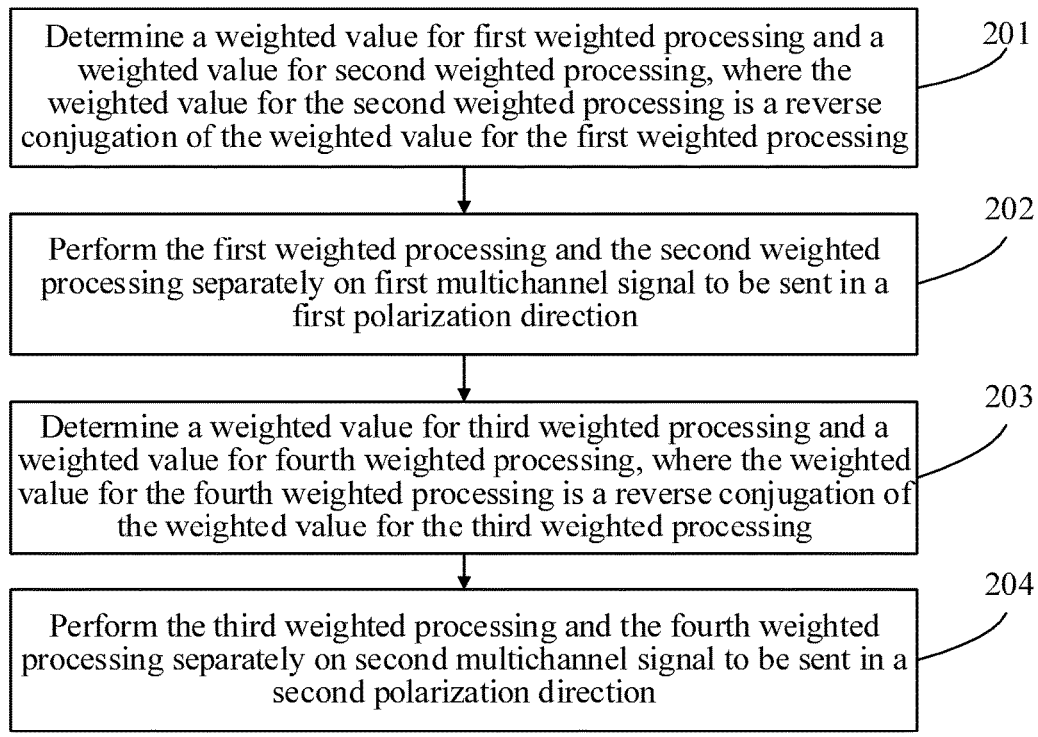
FIG. 2 is a flowchart of an antenna port mapping method according to another embodiment of the present disclosure.

Another embodiment of the present disclosure provides an antenna port mapping method. With reference to the foregoing implementation environment and the content of the embodiment shown in FIG. 1, in an example, an antenna array includes four columns of antenna elements, that is, a quantity of columns of the antenna array is 4, and is mapped to four ports is used. Referring to FIG. 2, a procedure of the method provided by this embodiment includes the following steps.

201: Determine a weighted value for first weighted processing and a weighted value for second weighted processing, where the weighted value for the second weighted processing is a reverse conjugation of the weighted value for the first weighted processing.

This embodiment does not limit a specific method for determining the weighted value for the first weighted processing, and includes but not limited to, if an input port of the weighted value for the first weighted processing is provided, acquiring the input weighted value for the first weighted processing from the port, or, determining the weighted value for the first weighted processing using the following method steps.

Step 1: Determine a first array element spacing of an antenna array, and determine a second array element spacing that meets a networking coverage requirement.

When the antenna array is designed, an array element spacing of the antenna array is set. Therefore, when the antenna array is designed, the set array element spacing of the antenna array may be used as the first array element spacing.

For example, if the set array element spacing of the antenna array is $0.5\lambda$ when the antenna array is designed, $0.5\lambda$ is used as the first array element spacing.

In addition, the array element spacing of the antenna array is also correspondingly stipulated in the networking coverage requirement disclosed by mobile network operators. Therefore, the array element spacing of the antenna array stipulated in the networking coverage requirement is used as the second array element spacing.

For example, if the array element spacing of the antenna array stipulated in the networking coverage requirement is $0.65\lambda$, $0.65\lambda$ is used as the second array element spacing.

Step 2: According to the first array element spacing and the second array element spacing, fit a wide beam weighted value that meets the networking coverage requirement.

This embodiment does not limit a specific method for fitting, according to the first array element spacing and the second array element spacing, the wide beam weighted value that meets the networking coverage requirement, and includes but not limited to fitting, by the following step 2.1 to step 2.5, the wide beam weighted value that meets the networking coverage requirement.

Step 2.1: Determine an initial wide beam weighted value that meets a wide beam weighted value characteristic.

If a form of the wide beam weighted value is $[\alpha_1, \alpha_2, \alpha_3, \alpha_4]$, and has a characteristic of the following formula 1 or formula 2:

$$\alpha_1 \Rightarrow 1 \text{ or } \alpha_2 \Rightarrow 1; \text{ and} \qquad \text{formula 1:}$$

$$\alpha_3 \Rightarrow 1 \text{ or } \alpha_4 \Rightarrow 1. \qquad \text{formula 2:}$$

Multiple groups of wide beam weighted values may meet the foregoing characteristic, and any group of wide beam weighted values is used as the initial wide beam weighted value, where $\alpha_1, \alpha_2, \alpha_3, \alpha_4$ are four weighted value vectors of the wide beam weighted value.

In an example that two groups of wide beam weighted values meet the foregoing characteristic, and are $[\alpha_{11}, \alpha_{12}, \alpha_{13}, \alpha_{14}]$ and $[\alpha_{21}, \alpha_{22}, \alpha_{23}, \alpha_{24}]$, respectively, $[\alpha_{11}, \alpha_{12}, \alpha_{13}, \alpha_{14}]$ is used as an initial wide beam weighted value.

Certainly, the wide beam weighted value may further be represented in other forms, and this embodiment does not limit a specific representation form of the wide beam weighted value. The wide beam weighted value may further have another characteristic, and this embodiment does not limit a specific characteristic of the wide beam weighted value. There may also be another quantity of groups of wide beam weighted values that meet the wide beam weighted value characteristic, and this embodiment does not limit a quantity of wide beam weighted values that meet the wide beam weighted value characteristic. A method for determining the initial wide beam weighted value in at least one group of wide beam weighted values may further be another method, and this embodiment does not limit a specific method for determining the initial wide beam weighted value in the at least one group of wide beam weighted values.

Step 2.2: Calculate a third array element spacing according to the first array element spacing and the initial wide beam weighted value.

This embodiment does not limit a specific method for calculating the third array element spacing according to the first array element spacing and the initial wide beam weighted value. For example, if a form of the initial wide beam weighted value is $[\alpha_1, \alpha_2, \alpha_3, \alpha_4]$, the third array element spacing may be calculated using the following formula 3:

$$P = \text{angle} X/2\pi \sin(N), \qquad \text{Formula 3:}$$

where $X = X_1/X_2$, $$X_1 = \alpha_1 + \alpha_2 * \exp(j*2\pi m \sin(N)) + \alpha_3 * \exp(j*4\pi m \sin(N)) + \alpha_4 * \exp(j*6\pi m \sin(N)),$$

and $$X_2 = \alpha_4 * \exp(j*2\pi m(s-4)\sin(N)) + \alpha_3 * \exp(j*2\pi m(s-3)\sin(N)) + \alpha_2 * \exp(j*2\pi m(s-2)\sin(N)) + \alpha_1 * \exp(j*2\pi m(s-1)\sin(N)),$$

where P is the third array element spacing, s is a quantity of columns of an antenna array, N is an azimuth, m is the first array element spacing, and j is an imaginary part.

For example, if N is 30 degrees, the first array element spacing is $0.5\lambda$, and the initial wide beam weighted value is $[\alpha_1, \alpha_2, \alpha_3, \alpha_4]$, the quantity of columns of the antenna array is 4; therefore, N=30, s=4, m=$0.5\lambda$, and the third array element spacing is obtained using the following formula 4:

$$P = \text{angle} X/2\pi \sin 30° \qquad \text{Formula 4:}$$

where $X = X_1/X_2$, $$X_1 = \alpha_1 + \alpha_2 * \exp(j*\lambda\pi \sin 30°) + \alpha_3 * \exp(j*2\lambda\pi \sin 30°) + \alpha_4 * \exp(j*3\lambda\pi \sin 30°), \text{ and}$$

$$X_2 = \alpha_4 * \exp(j*0) + \alpha_3 * \exp(j*\lambda\pi \sin 30°) + \alpha_2 * \exp(j*2\lambda\pi \sin 30°) + \alpha_1 * \exp(j*3\lambda\pi \sin 30°).$$

Step 2.3: Determine, according to a relationship between the third array element spacing and the second array element spacing, whether the initial wide beam weighted value meets the networking coverage requirement. If it is determined, according to the relationship between the third array element spacing and the second array element spacing, that the initial wide beam weighted value meets the networking coverage requirement, step 2.4 is performed; and if it is determined, according to the relationship between the third array element spacing and the second array element spacing, that the initial wide beam weighted value does not meet the networking coverage requirement, step 2.5 is performed.

This embodiment does not limit a specific method for determining, according to the relationship between the third array element spacing and the second array element spacing, whether the initial wide beam weighted value meets the networking coverage requirement, and includes but not limited to, if a difference between the third array element spacing and the second array element spacing is greater than a first preset threshold, determining that the initial wide beam weighted value does not meet the networking coverage requirement; and if the difference between the third array element spacing and the second array element spacing is not greater than the first preset threshold, determining that the initial wide beam weighted value meets the networking coverage requirement.

For example, if the second array element spacing is $0.65\lambda$ and the third array element spacing calculated in step 2.2 is 0.85, the difference between the third array element spacing and the second array element spacing is $0.2\lambda$. If the first preset threshold is $0.1\lambda$, it is determined that the initial wide beam weighted value $[\alpha_1, \beta_1, \gamma_1, \eta_1]$ does not meet the networking coverage requirement; and if the first preset threshold is $0.2\lambda$, it is determined that the initial wide beam weighted value $[\alpha_1, \alpha_2, \alpha_3, \alpha_4]$ meets the networking coverage requirement.

The first preset threshold may further be another value, and this embodiment does not limit a specific value of the first preset threshold.

Step 2.4: Use the initial wide beam weighted value as a wide beam weighted value that meets the networking coverage requirement.

For example, if the initial wide beam weighted value $[\alpha_1, \alpha_2, \alpha_3, \alpha_4]$ determined in step 2.3 meets the networking coverage requirement, $[\alpha_1, \alpha_2, \alpha_3, \alpha_4]$ is used as the wide beam weighted value that meets the networking coverage requirement.

Step 2.5: Re-determine, according to the initial wide beam weighted value, an initial wide beam weighted value that meets the wide beam weighted value characteristic; calculate a third array element spacing according to the first array element spacing and the initial wide beam weighted value; and determine, according to the relationship between the third array element spacing and the second array element spacing, whether the initial wide beam weighted value meets the networking coverage requirement, until the wide beam weighted value that meets the networking coverage requirement is obtained.

There may be multiple groups of wide beam weighted values that meet the wide beam weighted value characteristic, and the initial wide beam weighted value is one group of the multiple groups of wide beam weighted values that meet the wide beam weighted value characteristic. Therefore, another group of wide beam weighted values may be selected from the multiple groups of wide beam weighted values that meet the wide beam weighted value characteristic, and step 2.2 and step 2.3 are performed again, until the wide beam weighted value that meets the networking coverage requirement is obtained. Each time when step 2.2 and step 2.3 are performed again, a specific performing method is the same as the method described in step 2.2 and step 2.3, the only difference lies in that an initial wide beam weighted value involved in calculation is changed to another selected group of wide beam weighted values.

This embodiment does not limit a standard for selecting another group of wide beam weighted values from the multiple groups of wide beam weighted values that meet the wide beam weighted value characteristic, for example, selecting, from the multiple groups of wide beam weighted values that meet the wide beam weighted value characteristic, any group of wide beam weighted values that has not been selected.

For example, three groups of wide beam weighted values meet the wide beam weighted value characteristic, and are separately $[\alpha_{11}, \alpha_{12}, \alpha_{13}, \alpha_{14}]$, $[\alpha_{21}, \alpha_{22}, \alpha_{23}, \alpha_{24}]$, and $[\alpha_{31}, \alpha_{32}, \alpha_{33}, \alpha_{34}]$. If it is determined in step 2.3 that an initial wide beam weighted value $[\alpha_{11}, \alpha_{12}, \alpha_{13}, \alpha_{14}]$ does not meet the networking coverage requirement, another group of wide beam weighted values $[\alpha_{21}, \alpha_{22}, \alpha_{23}, \alpha_{24}]$ may be selected from the other two groups of wide beam weighted values that meet the wide beam weighted value characteristic, and step 2.2 and step 2.3 are performed again, where step 2.2 is calculating the third array element spacing according to the first array element spacing and an initial wide beam weighted value $[\alpha_{21}, \alpha_{22}, \alpha_{23}, \alpha_{24}]$, and step 2.3 is determining, according to the relationship between the third array element spacing and the second array element spacing, whether the initial wide beam weighted value $[\alpha_{21}, \alpha_{22}, \alpha_{23}, \alpha_{24}]$ meets the networking coverage requirement. If it is determined, according to the relationship between the third array element spacing and the second array element spacing, that the initial wide beam weighted value $[\alpha_{21}, \alpha_{22}, \alpha_{23}, \alpha_{24}]$ meets the networking coverage requirement, step 2.4 is performed; and if it is determined, according to the relationship between the third array element spacing and the second array element spacing, that the initial wide beam weighted value $[\alpha_{21}, \alpha_{22}, \alpha_{23}, \alpha_{24}]$ does not meet the networking coverage requirement, step 2.5 is performed, that is, $[\alpha_{31}, \alpha_{32}, \alpha_{33}, \alpha_{34}]$ is selected as the initial wide beam weighted value, and step 2.2 and step 2.3 are performed again using $[\alpha_{31}, \alpha_{32}, \alpha_{33}, \alpha_{34}]$ as the initial wide beam weighted value, until the wide beam weighted value that meets the networking coverage requirement is obtained.

It should be noted that, in order to reach a relatively wide third array element spacing, a center of gravity of the wide beam weighted value that meets the networking coverage requirement approaches an array element spacing that is required; therefore, the center of gravity of the wide beam weighted value that meets the networking coverage requirement may be pre-estimated. In step 2.1, an initial wide beam weighted value is determined according to the pre-estimated center of gravity of the wide beam weighted value that meets the networking coverage requirement, so as to reduce a quantity of times of repeatedly selecting the initial wide beam weighted value. In step 2.2, when the third array element spacing is calculated, a numerator in a formula for calculating the third array element spacing is an angle, and the angle is obtained through calculation using a phase. When the angle obtained through calculation is not less than $2\pi$, the numerator in the formula for calculating the third array element spacing is overturned, which causes incorrectness of the third array element spacing obtained through calculation; in this case, $2\pi$ needs to be subtracted from the angle obtained through calculation. In order to avoid occurrence of a case in which the angle obtained through calculation is not less than $2\pi$, a value range of the third array element spacing may be pre-estimated. In a case in which the third array element spacing is less than $\lambda$, N equals to 30° to the greatest extent; and in the case in which the third array element spacing is greater than $\lambda$, N becomes smaller.

This embodiment does not limit a specific method for pre-estimating the center of gravity of the wide beam weighted value that meets the networking coverage requirement.

In addition, the wide beam weighted value that meets the networking coverage requirement is fitted according to the third array element spacing in step 2, where the third array element spacing is obtained using formula 3. It may be seen from the foregoing formula 3 that the third array element spacing is in a one-to-one correspondence with N. Therefore, at least one array element spacing corresponding to at least one preset antenna azimuth is obtained according to the wide beam weighted value that meets the networking coverage requirement and the at least one preset antenna azimuth. In order to ensure that the at least one array element spacing corresponding to the at least one preset antenna azimuth meets the networking coverage requirement, where the at least one array element spacing is obtained according to the wide beam weighted value that meets the networking coverage requirement, step 2.6 to step 2.8 may further be performed after step 2.5 is performed.

Step 2.6: Calculate a fourth array element spacing according to the first array element spacing and the wide beam weighted value that meets the networking coverage requirement.

This embodiment does not limit a specific method for calculating the fourth array element spacing according to the first array element spacing and the wide beam weighted value that meets the networking coverage requirement. For example, if a form of the wide beam weighted value that meets the networking coverage requirement is $[\alpha_1, \alpha_2, \ldots, \alpha_s]$, at least one preset antenna azimuth may be acquired, and at least one fourth array element spacing corresponding to the at least one antenna azimuth is calculated using the following formula 5.

For example, if the at least one preset azimuth is an azimuth of 30 degrees or an azimuth of 60 degrees, the first array element spacing is $0.5\lambda$, and the wide beam weighted value that meets the networking coverage requirement is $[\alpha_1, \alpha_2, \alpha_3, \alpha_4]$, the quantity of columns of the antenna array is 4; therefore, N=30 degrees, s=4, m=$0.5\lambda$, and a corresponding fourth array element spacing 1 is obtained using the following formula 5.

$$P_1 = \text{angle}X/2\pi \sin 30° \quad \text{Formula 5:}$$

where $X = X_1/X_2$, $X_1 = \alpha_1 + \alpha_2 * \exp(j*\lambda\pi \sin 30°) + \alpha_3 * \exp(j*2\lambda\pi \sin 30°) + \alpha_4 * \exp(j*3\lambda\pi \sin 30°)$, and $X_2 = \alpha_4 * \exp(j*0) + \alpha_3 * \exp(j*\lambda\pi \sin 30°) + \alpha_2 * \exp(j*2\lambda\pi \sin 30°) + \alpha_1 * \exp(j*3\lambda\pi \sin 30°)$ N=60 degrees, s=4, m=$0.5\lambda$, and a corresponding fourth array element spacing 2 is obtained using the following formula 6.

$$P = \text{angle}X/2\pi \sin 60° \quad \text{Formula 6:}$$

where $X = X_1/X_2$, $X_1 = \alpha_1 + \alpha_2 * \exp(j*\lambda\pi \sin 60°) + \alpha_3 * \exp(j*2\lambda\pi \sin 60°) + \alpha_4 * \exp(j*3\lambda\pi \sin 60°)$, and $X_2 = \alpha_4 * \exp(j*0) + \alpha_3 * \exp(j*\lambda\pi \sin 60°) + \alpha_2 * \exp(j*2\lambda\pi \sin 60°) + \alpha_1 * \exp(j*3\lambda\pi \sin 60°)$.

A quantity of preset azimuths may further be another quantity, and angles of preset azimuths may further be other angles. This embodiment does not limit a specific quantity of the preset azimuths and specific angles of the preset azimuths.

Step 2.7: Determine whether the fourth array element spacing and the second array element spacing are in a preset relationship; and if the fourth array element spacing and the second array element spacing are in the preset relationship, end the procedure ensuring that an array element spacing corresponding to each azimuth meets the networking coverage requirement, where the array element spacing is obtained according to the wide beam weighted value that meets the networking coverage requirement, and perform step 3; and if the fourth array element spacing and the second array element spacing are not in the preset relationship, perform step 2.8.

This embodiment does not limit a specific method for determining whether the fourth array element spacing and the second array element spacing are in the preset relationship, and includes but not limited to, if all differences between the fourth array element spacing and the second array element spacing are not greater than a second preset threshold, determining that the fourth array element spacing and the second array element spacing are in the preset relationship; and if at least one difference between the fourth array element spacing and the second array element spacing is greater than the second preset threshold, determining that the fourth array element spacing and the second array element spacing are not in the preset relationship.

For example, if the second array element spacing is $0.6\lambda$, the fourth array element spacing 1 obtained through calculation in step 2.6 is 0.85, and the fourth array element spacing 2 obtained through calculation in step 2.6 is 0.75, a difference between the fourth array element spacing 1 and the second array element spacing is $0.2\lambda$, and a difference between the fourth array element spacing 2 and the second array element spacing is $0.1\lambda$. If the second preset threshold is $0.1\lambda$, it is determined that the fourth array element spacing and the second array element spacing are not in the preset relationship because the difference $0.2\lambda$ between the fourth array element spacing 1 and the second array element spacing is greater than the second preset threshold $0.1\lambda$. If the second preset threshold is $0.2\lambda$, it is determined that the fourth array element spacing and the second array element spacing are in the preset relationship because the difference $0.2\lambda$ between the fourth array element spacing 1 and the second array element spacing is not greater than the second preset threshold $0.2\lambda$, and the difference $0.1\lambda$ between the fourth array element spacing 2 and the second array element spacing is also not greater than the second preset threshold $0.2\lambda$.

The second preset threshold may further be another value, and this embodiment does not limit a specific value of the second preset threshold.

In addition, the second preset threshold may be the same as or different from the first preset threshold in step 2.3 of step 2, and this embodiment does not limit a specific relationship between the second preset threshold and the first preset threshold.

Step 2.8: Adjust the wide beam weighted value that meets the networking coverage requirement under a condition of meeting the wide beam weighted value characteristic, calculate an adjusted fourth array element spacing according to the first array element spacing and an adjusted wide beam weighted value that meets the networking coverage requirement, and determine whether the adjusted fourth array element spacing and the second array element spacing are in the preset relationship; and if the adjusted fourth array element spacing and the second array element spacing are not in the preset relationship, readjust the wide beam weighted value that meets the networking coverage requirement under the condition of meeting the wide beam weighted value characteristic, calculate, according to the first array element spacing and an adjusted wide beam weighted value that meets the networking coverage requirement, an adjusted fourth array element spacing, and determine whether the adjusted fourth array element spacing and the second array element spacing are in the preset relationship, until the adjusted fourth array element spacing and the second array element spacing are in the preset relationship, and the wide beam weighted value that meets the networking coverage requirement and conforms to the preset relationship is obtained.

For example, if the wide beam weighted value that meets the networking coverage requirement is $[\alpha_1, \alpha_2, \alpha_3, \alpha_4]$, a value of $\alpha_1$ may be slightly adjusted under the condition of meeting the wide beam weighted value characteristic, to obtain an adjusted $\alpha_1$; and an adjusted wide beam weighted value $[\alpha'_1, \alpha'_2, \alpha'_3, \alpha'_4]$ that meets the networking coverage requirement is obtained according to $\alpha'_1$. An adjusted fourth array element spacing is calculated according to the first array element spacing and the adjusted wide beam weighted value $[\alpha'_1, \alpha'_2, \alpha'_3, \alpha'_4]$ that meets the networking coverage requirement; and it is determined whether the adjusted fourth array element spacing and the second array element spacing are in the preset relationship, until the adjusted fourth array element spacing and the second array element spacing are in the preset relationship, and the wide beam weighted value that meets the networking coverage requirement and conforms to the preset relationship is obtained.

A specific manner of ensuring that at least one array element spacing corresponding to at least one preset azimuth meets the networking coverage requirement, where the at least one array element spacing is obtained according to the wide beam weighted value that meets the networking coverage requirement, may further be another manner, other than the manners described in step 2.6 to step 2.7. This embodiment does not limit the specific manner of ensuring that at least one array element spacing corresponding to at least one preset azimuth meets the networking coverage requirement, where the at least one array element spacing is obtained according to the wide beam weighted value that meets the networking coverage requirement.

It should be noted that for an antenna array that is an FA antenna with a passive network of 8 channels and 4 columns of array elements, and with a first array element spacing being 0.5λ and an element beam main lobe at 100°±15°, because a problem of power limitation of a single-column array does not need to be considered, if the second array element spacing that meets the networking coverage requirement is 0.6λ, the fitted wide beam weighted value that meets the networking coverage requirement is [0.3, 0.9, 1, −0.5].

In addition, for an antenna array that is an FA antenna with an active network of 8 channels and 4 columns of array elements, and with a first array element spacing being 0.5λ and an element beam main lobe at 100°±15°, because a problem of power limitation of a single-column array does not need to be considered, if the second array element spacing that meets the networking coverage requirement is λ, the fitted wide beam weighted value that meets the networking coverage requirement is [1, 1, u, v], where u is any value between −0.35 and −0.2 and v is any value between 0 and 0.15.

Specific values of u and v may be optimized, according to a wave width and a gain of each column of antenna, within a range, between −0.35 and −0.2, corresponding to u and within a range, between 0 and 0.15, corresponding to v, to obtain an optimal value. After the optimal value is obtained, power normalization processing is performed on the wide beam weighted value. An entire process of obtaining the optimal value and performing optimization imposes slight impact on performance indicators of the antenna array.

Certainly, specific values of u and v may further be obtained using another method, and this embodiment does not limit the method for obtaining specific values of u and v.

Step 3: Determine a fitted wide beam weighted value that meets the networking coverage requirement to a weighted value for first weighted processing.

The weighted value for the first weighted processing may be obtained by performing the foregoing step 1 to step 3. Because a beam phase difference has a unidirectionally continuous change characteristic, reverse conjugation may be performed on an obtained weighted value for the first weighted processing according to the characteristic, and a wide beam weighted value obtained through the reverse conjugation is used as the weighted value for the second weighted processing.

Certainly, the weighted value for the second weighted processing may be obtained using another method, and this embodiment does not limit a specific method for obtaining the weighted value for the second weighted processing.

202: Perform the first weighted processing and the second weighted processing separately on first multichannel signal to be sent in a first polarization direction.

A specific implementation method for performing the first weighted processing and the second weighted processing separately on the first multichannel signal to be sent in the first polarization direction may be implemented using a first weighted value matrix that is formed by the weighted value for the first weighted processing and the weighted value for the second weighted processing. This embodiment does not limit a specific method for performing the first weighted processing and the second weighted processing separately on the first multichannel signal to be sent in the first polarization direction.

For example, if the weighted value for the first weighted processing is $[\alpha_1, \alpha_2, \ldots, \alpha_s]$ and the weighted value for the second weighted processing is $[\alpha_s, \alpha_{s-1}, \ldots, \alpha_1]$, the formed first weighted value matrix is $$\begin{bmatrix} \alpha_1, \alpha_2, \ldots, \alpha_s \\ \alpha_s, \alpha_{s-1}, \ldots, \alpha_1 \end{bmatrix}.$$

In addition, a first beam and a second beam are formed in the first polarization direction after an antenna array radiates the processed first multichannel signal, thereby implementing mapping of the antenna array to two antenna ports in the first polarization direction.

203: Determine a weighted value for third weighted processing and a weighted value for fourth weighted processing, where the weighted value for the fourth weighted processing is a reverse conjugation of the weighted value for the third weighted processing.

This embodiment does not limit a specific method for determining the weighted value for the third weighted processing, and includes but not limited to, if an input port of the weighted value for the third weighted processing is provided, acquiring the input weighted value for the third weighted processing from the port; or, determining the weighted value for the third weighted processing using the following method.

Step a: Determine a first array element spacing of an antenna array, and determine a second array element spacing that meets a networking coverage requirement.

Step b: According to the first array element spacing and the second array element spacing, fit a wide beam weighted value that meets the networking coverage requirement.

In order to ensure that at least one array element spacing corresponding to at least one preset azimuth meets the networking coverage requirement, where the at least one array element spacing is obtained according to the wide beam weighted value that meets the networking coverage requirement, step b1 to step b3 may further be performed after step b is performed.

Step b1: Calculate a fourth array element spacing according to the first array element spacing and the wide beam weighted value that meets the networking coverage requirement.

Step b2: Determine whether the fourth array element spacing and the second array element spacing are in a preset relationship; and if the fourth array element spacing and the second array element spacing are in the preset relationship, end the procedure ensuring that an array element spacing corresponding to each azimuth meets the networking coverage requirement, where the array element spacing is obtained according to the wide beam weighted value that meets the networking coverage requirement, and perform step c; and if the fourth array element spacing and the second array element spacing are not in the preset relationship, perform step b3.

Step b3: Adjust the wide beam weighted value that meets the networking coverage requirement under a condition of meeting the wide beam weighted value characteristic, calculate an adjusted according to the first array element spacing and an adjusted wide beam weighted value that meets the networking coverage requirement, and determine whether the adjusted fourth array element spacing and the second array element spacing are in the preset relationship; and if the adjusted fourth array element spacing and the second array element spacing are not in the preset relationship, readjust the wide beam weighted value that meets the networking coverage requirement under the condition of meeting the wide beam weighted value characteristic, calculate, according to the first array element spacing and an adjusted wide beam weighted value that meets the networking coverage requirement, an adjusted fourth array element spacing, and determine whether the adjusted fourth array element spacing and the second array element spacing are in the preset relationship, until the adjusted fourth array element spacing and the second array element spacing are in the preset relationship, and the wide beam weighted value that meets the networking coverage requirement and conforms to the preset relationship is obtained.

Step c: Determine a fitted wide beam weighted value that meets the networking coverage requirement to a weighted value for third weighted processing.

The weighted value for the third weighted processing may be obtained by performing the foregoing step a to step c. Because a beam phase difference has a unidirectionally continuous change characteristic, reverse conjugation may be performed on an obtained weighted value for the third weighted processing according to the characteristic, and a wide beam weighted value obtained through the reverse conjugation is used as the weighted value for the fourth weighted processing.

Certainly, the weighted value for the fourth weighted processing may further be obtained using another method, and this embodiment does not limit a specific method for obtaining the weighted value for the fourth weighted processing.

204: Perform the third weighted processing and the fourth weighted processing separately on second multichannel signal to be sent in a second polarization direction.

A specific implementation method for performing the third weighted processing and the fourth weighted processing separately on the second multichannel signal to be sent in the second polarization direction may be implemented using a second weighted value matrix that is formed by the weighted value for the third weighted processing and the weighted value for the fourth weighted processing. This embodiment does not limit a specific method for performing the third weighted processing and the fourth weighted processing separately on the second multichannel signal to be sent in the second polarization direction.

For example, if the weighted value for the third weighted processing is $[\beta_1, \beta_2, \ldots, \beta_s]$ and the weighted value for the fourth weighted processing is $[\beta_s, \beta_{s-1}, \ldots, \beta_1]$, the formed second weighted value matrix is $$\begin{bmatrix} \beta_1, \beta_2, \ldots, \beta_s \\ \beta_s, \beta_{s-1}, \ldots, \beta_1 \end{bmatrix}.$$

In addition, a third beam and a fourth beam are formed in the second polarization direction after the antenna array radiates the processed second multichannel signal, thereby implementing mapping of the antenna array to the other two antenna ports in the second polarization direction.

It should be noted that, in a mapping scenario in which an antenna array is mapped to two antenna ports, mapping may be directly performed using the method provided by this embodiment, to map a co-polarized antenna array to a same antenna port. In a mapping scenario in which an antenna array is mapped to four antenna ports, mapping may also be directly performed using the method provided by this embodiment, to map a co-polarized antenna array to two antenna ports. In a mapping scenario in which an antenna array is mapped to eight or more antenna ports, mapping may also be first directly performed using the method provided by this embodiment, to map a co-polarized antenna array to multiple groups of antenna ports, where each group of antenna ports includes multiple antenna ports. For each group of antenna ports, an antenna array previously mapped to the group is mapped again to multiple antenna ports in the group of antenna ports by repeatedly using the method provided by this embodiment. This embodiment does not limit a specific mapping scenario in which an antenna array is mapped to an antenna port.

In addition, this embodiment describes the method provided in this embodiment in a sequence in which the first weighted processing and the second weighted processing are first performed separately on the first multichannel signal to be sent in the first polarization direction, and then the third weighted processing and fourth weighted processing are performed separately on the second multichannel signal to be sent in the second polarization direction. In a specific implementation process, the third weighted processing and the fourth weighted processing may further be first performed separately on the second multichannel signal to be sent in the second polarization direction, and then the first weighted processing and the second weighted processing are performed separately on the first multichannel signal to be sent in the first polarization direction. Alternatively, when the first weighted processing and the second weighted processing are performed separately on the first multichannel signal to be sent in the first polarization direction, the third weighted processing and the fourth weighted processing are performed separately on the second multichannel signal to be sent in the second polarization direction. This embodiment does not limit a specific processing sequence of performing the first weighted processing and the second weighted processing separately on the first multichannel signal to be sent in the first polarization direction, and performing the third weighted processing and the fourth weighted processing separately on the second multichannel signal to be sent in the second polarization direction.

In addition, only an antenna array including four columns of antenna elements is also used as an example in this embodiment. In specific implementation, a quantity of columns of antenna elements included in the antenna array may further be another value, and this embodiment does not limit the quantity of columns of antenna elements included in the antenna array.

In the method provided by this embodiment, weighted processing is performed separately on multichannel signal to be sent in a first polarization direction and in a second polarization direction, and two beams in the first polarization direction and two beams in the second polarization direction are formed separately after an antenna array separately radiates the processed multichannel signal, which implements mapping of the antenna array to four antenna ports, thereby extending an application scenario of antenna port mapping.

Figure 3:
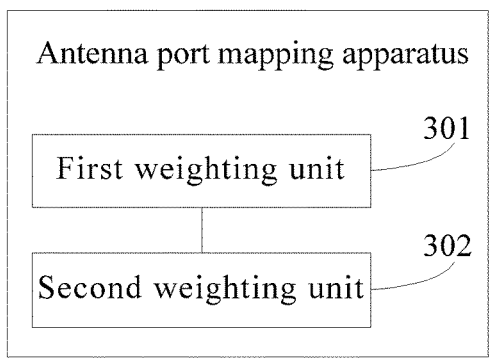
FIG. 3 is a schematic structural diagram of an antenna port mapping apparatus according to another embodiment of the present disclosure.

Another embodiment of the present disclosure provides an antenna port mapping apparatus, where the apparatus is configured to execute the antenna port mapping method provided by the foregoing embodiment shown in FIG. 1 or FIG. 2. The apparatus is configured to implement mapping of an antenna array to four antenna ports, where the antenna array includes multiple columns of antenna elements and has a first polarization direction and a second polarization direction. Referring to FIG. 3, the apparatus includes a first weighting unit 301 configured to perform first weighted processing and second weighted processing separately on first multichannel signal to be sent in the first polarization direction, and form a first beam and a second beam in the first polarization direction after the antenna array radiates the processed first multichannel signal, so as to implement mapping of the antenna array to two ports in the first polarization direction, where a weighted value for the second weighted processing is a reverse conjugation of a weighted value for the first weighted processing; and a second weighting unit 302 configured to perform third weighted processing and fourth weighted processing separately on second multichannel signal to be sent in the second polarization direction, and form a third beam and a fourth beam in the second polarization direction after the antenna array radiates the processed second multichannel signal, so as to implement mapping of the antenna array to the other two ports in the second polarization direction, where a weighted value for the fourth weighted processing is a reverse conjugation of a weighted value for the third weighted processing.

The first weighting unit 301 performs weighted processing using a first weighted value matrix, and the first weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

where s is a quantity of columns of the antenna array; and the second weighting unit 302 performs weighted processing using a second weighted value matrix, and the second weighted value matrix is:

$$\begin{bmatrix} \beta_1, \beta_2, \ldots, \beta_s \\ \beta_s, \beta_{s-1}, \ldots, \beta_1 \end{bmatrix},$$

where s is the quantity of columns of the antenna array.

The antenna array includes four columns of antenna elements.

The apparatus provided by this embodiment performs weighted processing separately on multichannel signal to be sent in a first polarization direction and in a second polarization direction, and separately forms two beams in the first polarization direction and two beams in the second polarization direction after an antenna array separately radiates the processed multichannel signal, which implements mapping of the antenna array to four antenna ports, thereby extending an application scenario of antenna port mapping.

Figure 4:
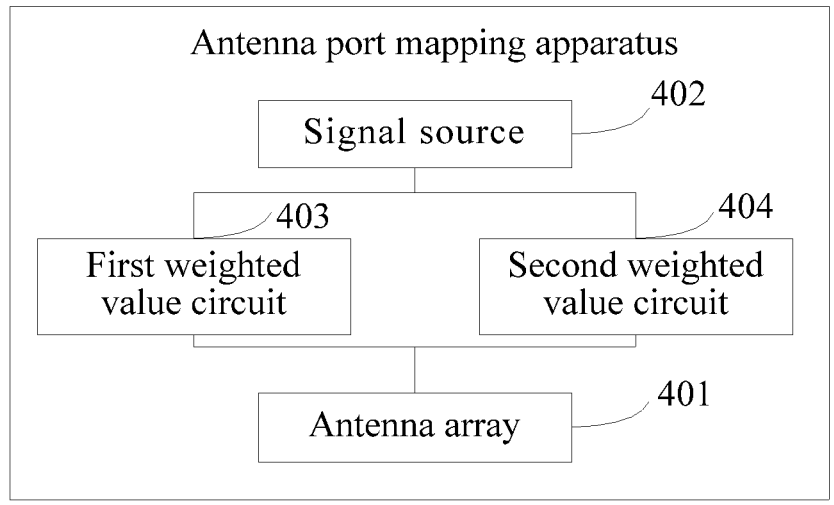
FIG. 4 is a schematic structural diagram of an antenna port mapping apparatus according to another embodiment of the present disclosure.

Another embodiment of the present disclosure provides an antenna port mapping apparatus, where the antenna port mapping apparatus is configured to execute the antenna port mapping method provided by the foregoing embodiment shown in FIG. 1 or FIG. 2. Referring to FIG. 4, the apparatus includes an antenna array 401, including multiple columns of antenna elements and having a first polarization direction and a second polarization direction; a signal source 402 configured to provide first multichannel signal to be sent in the first polarization direction and second multichannel signal to be sent in the second polarization direction; a first weighted value circuit 403 configured to perform first weighted processing and second weighted processing separately on the first multichannel signal, and form a first beam and a second beam in the first polarization direction after the antenna array 401 radiates the processed first multichannel signal, so as to implement mapping of the antenna array to two ports in the first polarization direction, where a weighted value for the second weighted processing is a reverse conjugation of a weighted value for the first weighted processing; and a second weighted value circuit 404 configured to perform third weighted processing and fourth weighted processing separately on the second multichannel signal, and form a third beam and a fourth beam in the second polarization direction after the antenna array 401 radiates the processed second multichannel signal, so as to implement mapping of the antenna array to the other two ports in the second polarization direction, where a weighted value for the fourth weighted processing is a reverse conjugation of a weighted value for the third weighted processing.

Optionally, the first weighted value circuit 403 performs weighted processing using a first weighted value matrix, and the first weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

where s is a quantity of columns of the antenna array; and the second weighted value circuit 404 performs weighted processing using a second weighted value matrix, and the second weighted value matrix is:

$$\begin{bmatrix} \beta_1, \beta_2, \ldots, \beta_s \\ \beta_s, \beta_{s-1}, \ldots, \beta_1 \end{bmatrix},$$

where s is the quantity of columns of the antenna array.

Optionally, the antenna array includes four columns of antenna elements.

In conclusion, the apparatus provided by this embodiment performs weighted processing separately on multichannel signal to be sent in a first polarization direction and in a second polarization direction, and separately forms two beams in the first polarization direction and two beams in the second polarization direction after an antenna array separately radiates the processed multichannel signal, which implements mapping of the antenna array to four antenna ports, thereby extending an application scenario of antenna port mapping.

Figure 5:
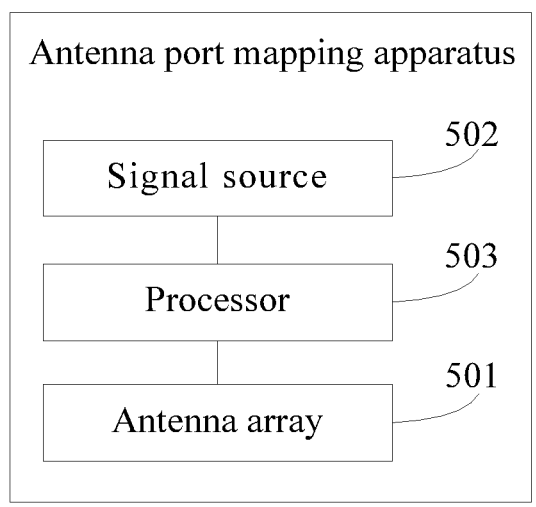
FIG. 5 is a schematic structural diagram of an antenna port mapping apparatus according to another embodiment of the present disclosure.

Another embodiment of the present disclosure provides an antenna port mapping apparatus, where the antenna port mapping apparatus is configured to execute the antenna port mapping method provided by the foregoing embodiment shown in FIG. 1 or FIG. 2. Referring to FIG. 5, the apparatus includes an antenna array 501, including multiple columns of antenna elements and having a first polarization direction and a second polarization direction; a signal source 502 configured to provide first multichannel signal to be sent in the first polarization direction and second multichannel signal to be sent in the second polarization direction; a processor 503 configured to perform first weighted processing and second weighted processing separately on the first multichannel signal, and form a first beam and a second beam in the first polarization direction after the antenna array 501 radiates the processed first multichannel signal, so as to implement mapping of the antenna array to two ports in the first polarization direction, where a weighted value for the second weighted processing is a reverse conjugation of a weighted value for the first weighted processing, and the processor 503 is further configured to perform third weighted processing and fourth weighted processing separately on the second multichannel signal, and form a third beam and a fourth beam in the second polarization direction after the antenna array 501 radiates the processed second multichannel signal, so as to implement mapping of the antenna array to the other two ports in the second polarization direction, where a weighted value for the fourth weighted processing is a reverse conjugation of a weighted value for the third weighted processing.

In conclusion, the apparatus provided by this embodiment performs weighted processing separately on multichannel signal to be sent in a first polarization direction and in a second polarization direction, and separately forms two beams in the first polarization direction and two beams in the second polarization direction after an antenna array separately radiates the processed multichannel signal, which implements mapping of the antenna array to four antenna ports, thereby extending an application scenario of antenna port mapping.

It should be noted that in an antenna port mapping process of the antenna port mapping apparatus provided by the foregoing embodiments, a division of the foregoing functional modules is only used as an example. In an actual application, the foregoing functions may be allocated and implemented by different functional modules according to requirements, that is, an internal structure of the antenna port mapping apparatus is divided into the different functional modules for implementing all or some of the functions described above. In addition, the antenna port mapping apparatus provided by the foregoing embodiments and the antenna port mapping method embodiments belong to a same conception, and for details about a specific implementation process of the antenna port mapping apparatus and an the antenna port mapping method, reference is made to the method embodiments, and details are not repeatedly described herein.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the principle of the present disclosure shall fall within the protection scope of the present disclosure.

What is claimed is:

1. An antenna port mapping method; used to implement mapping of an antenna array to four antenna ports, wherein the antenna array comprises multiple columns of antenna elements and has a first polarization direction and a second polarization direction, the method comprising:
performing, by a processor of an antenna port mapping apparatus comprising the antenna array, first weighted processing and second weighted processing separately on a first multichannel signal to be sent in the first polarization direction;
forming, by the processor, a first beam and a second beam in the first polarization direction after the antenna array radiates the processed first multichannel signal to implement mapping of the antenna array to two ports in the first polarization direction, wherein the second weighted processing is a reverse order of the first weighted processing;
performing, by the processor, third weighted processing and fourth weighted processing separately on a second multichannel signal to be sent in the second polarization direction; and
forming, by the processor, a third beam and a fourth beam in the second polarization direction after the antenna array radiates the processed second multichannel signal to implement mapping of the antenna array to the other two ports in the second polarization direction, wherein the fourth weighted processing is a reverse order of the third weighted processing,
wherein the first weighted processing and the second weighted processing are implemented using a first weighted value matrix, and wherein the first weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

wherein s is a quantity of columns of the antenna array, each α is a weighted value corresponding to a particular element of the first weighted value matrix, a first row of the first weighted value matrix corresponds to the first weighted processing and a second row of the first weighted value matrix corresponds to the second weighted processing,
wherein the third weighted processing and the fourth weighted processing are implemented using a second weighted value matrix, wherein the second weighted value matrix is:

$$\begin{bmatrix} \beta_1, \beta_2, \ldots, \beta_s \\ \beta_s, \beta_{s-1}, \ldots, \beta_1 \end{bmatrix},$$

and
wherein s is the quantity of columns of the antenna array, each β is a weighted value corresponding to a particular element of the second weighted value matrix, a first row of the second weighted value matrix corresponds to the third weighted processing and a second row of the second weighted value matrix corresponds to the fourth weighted processing.

2. The method of claim 1, wherein the antenna array comprises four columns of antenna elements.

3. An antenna port mapping apparatus, comprising:
an antenna array comprising multiple columns of antenna elements and having a first polarization direction and a second polarization direction;
a signal source configured to provide a first multichannel signal to be sent in the first polarization direction and a second multichannel signal to be sent in the second polarization direction;
a first weighted value circuit configured to perform first weighted processing and second weighted processing separately on the first multichannel signal, and form a first beam and a second beam in the first polarization direction after the antenna array radiates the processed first multichannel signal to implement mapping of the antenna array to two ports in the first polarization direction, wherein the second weighted processing is a reverse order of the first weighted processing; and
a second weighted value circuit configured to perform third weighted processing and fourth weighted processing separately on the second multichannel signal, and form a third beam and a fourth beam in the second polarization direction after the antenna array radiates the processed second multichannel signal to implement mapping of the antenna array to the other two ports in the second polarization direction, wherein the fourth weighted processing is a reverse order of the third weighted processing,
wherein the first weighted value circuit performs weighted processing using a first weighted value matrix, and wherein the first weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

wherein s is a quantity of columns of the antenna array, each α is a weighted value corresponding to a particular element of the first weighted value matrix, a first row of the first weighted value matrix corresponds to the first weighted processing and a second row of the first weighted value matrix corresponds to the second weighted processing,
wherein the second weighted value circuit performs weighted processing using a second weighted value matrix, wherein the second weighted value matrix is:

$$\begin{bmatrix} \beta_1, \beta_2, \ldots, \beta_s \\ \beta_s, \beta_{s-1}, \ldots, \beta_1 \end{bmatrix},$$

and
wherein s is the quantity of columns of the antenna array, each β is a weighted value corresponding to a particular element of the second weighted value matrix, a first row of the second weighted value matrix corresponds to the third weighted processing and a second row of the second weighted value matrix corresponds to the fourth weighted processing.

4. The apparatus of claim 3, wherein the antenna array comprises four columns of antenna elements.

5. An antenna port mapping apparatus, comprising:
an antenna array comprising multiple columns of antenna elements and having a first polarization direction and a second polarization direction;
a signal source configured to provide a first multichannel signal to be sent in the first polarization direction and a second multichannel signal to be sent in the second polarization direction; and
a processor configured to perform first weighted processing and second weighted processing separately on the first multichannel signal, and form a first beam and a second beam in the first polarization direction after the antenna array radiates the processed first multichannel signal to implement mapping of the antenna array to two ports in the first polarization direction, wherein a second weighted value for the second weighted processing is a reverse order of a first weighted value for the first weighted processing,
wherein the processor is further configured to perform third weighted processing and fourth weighted processing separately on the second multichannel signal, and form a third beam and a fourth beam in the second polarization direction after the antenna array radiates the processed second multichannel signal to implement mapping of the antenna array to the other two ports in the second polarization direction, wherein a fourth weighted value for the fourth weighted processing is a reverse order of a third weighted value for the third weighted processing,
wherein the processor performs first weighted processing and second weighted processing using a first weighted value matrix, and wherein the first weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

wherein s is a quantity of columns of the antenna array, each α is a weighted value corresponding to a particular element of the first weighted value matrix, a first row of the first weighted value matrix corresponds to the first weighted processing and a second row of the first weighted value matrix corresponds to the second weighted processing,
wherein the processor performs third weighted processing and fourth weighted processing using a second weighted value matrix, wherein the second weighted value matrix is:

$$\begin{bmatrix} \alpha_1, \alpha_2, \ldots, \alpha_s \\ \alpha_s, \alpha_{s-1}, \ldots, \alpha_1 \end{bmatrix},$$

and
wherein s is the quantity of columns of the antenna array, each β is a weighted value corresponding to a particular element of the second weighted value matrix, a first row of the second weighted value matrix corresponds to the third weighted processing and a second row of the second weighted value matrix corresponds to the fourth weighted processing.

6. The apparatus of claim 5, wherein the antenna array comprises four columns of antenna elements.

* * * * *

UNITED STATES PATENT AND TRADEMARK OFFICE
CERTIFICATE OF CORRECTION

PATENT NO. : 10,333,600 B2
APPLICATION NO. : 15/374360
DATED : June 25, 2019
INVENTOR(S) : Pengcheng Zhang Page 1 of 1

It is certified that error appears in the above-identified patent and that said Letters Patent is hereby corrected as shown below:

In the Claims

Claim 1, Column 20, Line 8: "method; used" should read "method used"

Claim 5, Column 22, Line 53 and 54: "$\begin{bmatrix} \alpha_1, \alpha_2, \cdots, \alpha_s \\ \alpha_s, \alpha_{s-1}, \cdots, \alpha_1 \end{bmatrix}$" should read "$\begin{bmatrix} \beta_1, \beta_2, \cdots, \beta_s \\ \beta_s, \beta_{s-1}, \cdots, \beta_1 \end{bmatrix}$"

Signed and Sealed this
Twenty-seventh Day of August, 2019

Andrei Iancu
*Director of the United States Patent and Trademark Office*